United States Patent Office 3,156,574
Patented Nov. 10, 1964

3,156,574
PROCESS OF INCORPORATING AQUEOUS PIGMENT COMPOSITION IN VISCOSE
Albert Stanley Gomm, Leslie Budworth Morgan, and Leonard Wood, all of Blackley, Manchester, England, assignors to Imperial Chemical Industries Limited, London, England, a corporation of Great Britain
No Drawing. Filed Aug. 19, 1960, Ser. No. 50,598
Claims priority, application Great Britain, Sept. 9, 1959, 30,768/59
1 Claim. (Cl. 106—165)

This invention relates to aqueous dispensions of pigments suitable for use in pigmenting cellulose xanthate (viscose) solutions such as are comonmly used in the manufacture of shaped articles such as yarns, foils and sponges made of regenerated cellulose.

It is well known to colour viscose rayon by incorporating with the cellulose xanthate solution an aqueous dispersion of an organic or inorganic pigment. However, in mixing the pigment dispersion with the viscose solution difficulties are encountered due to irreversible flocculation or agglomeration of the primary pigment particles when these particles come into contact with the viscose solution. The formation of clumps or agglomerates of primary particles prevents homogeneous dispersion of the pigment throughout the viscose solution so that the yarn or other shaped articles prepared by extrusion of the viscose solution into a coagulating bath are not uniformly coloured and the intrinsic brightness and strength of the pigment is not realised. Furthermore, the presence of these agglomerates may lead to difficulties in filtration of the viscose solution. Filtration is a necessary step before the viscose solution is extruded through the fine holes of the spinneret, consequently the formation of any large agglomerates may cause blockage of the filter, or because of removal of pigment by the filters there may be loss of tinctorial strength in the viscose after it is coagulated and formed into yarn. Also in making shaped articles such as sponges the non-uniform distribution of pigment leads to an uneven appearance.

It is usual to employ anionic surface-active agents in the manufacture of the pigment dispersions but certain of these anionic agents which are usually low molecular weight sulphonates or sulphates interact with the cationic agents commonly added to the acid coagulating liquors and may eventually cause blockage of the spinneret. Furthermore pigment dispersions made with simple anionic dispersing agents have poor stability when subjected to freezing and thawing and show marked irreversible agglomeration after exposure to these conditions.

It has been found that the difficulty already referred to in connection with the use of anionic dispersing agents may be avoided by employing cationic and/or non-ionic dispersing agents in the pigment dispersion.

It has also been found that the agglomeration referred to above may be avoided by incorporating in the pigment dispersion certain hydroxyl group containing high molecular weight organic solutes.

According to the present invention we provide aqueous pigment compositions suitable for colouring viscose solutions, comprising a pigment dispersed in water, a cationic and/or a non-ionic dispersing agent and a starch derivative at least 10% by weight of which comprises a constituent having at least 2 glucose units in the molecule and which derivative is capable of forming an aqueous solution containing at least 5% by weight of dissolved starch derivative.

The starch derivatives to be employed in the aqueous pigment compositions dissolve in water to the extent of at least 5% by weight at ordinary temperature and pressure or form aqueous solutions of such concentration in presence of the above-mentioned surface active agents. With some starch derivatives of high molecular weight aqueous solutions of the desired concentration only form in presence of these surface active agents. The starch derivatives are obtained by chemically modifying starch for example by the action of heat acids, alkalis or oxidising agents, or by etherifying the starch with alkylating agents. Suitable alkylating agents are the inorganic esters of aliphatic alcohols containing up to about 5 carbon atoms, for example alkyl halides and sulphates or with halogen substituted fatty acids such as chloracetic acid. If halogen substituted fatty acids are employed to modify the starch the corresponding carboxymethyl starches are obtained. The starch derivatives however formed comprise at least 10% by weight of a constituent which contains at least 2 glucose (glucopyranose) units in the molecule. Thus if the starch derivative is a dextrin it is a complex mixture of carbohydrates containing differing numbers of glucose units. If the starch is completely hydrolysed so that it contains no constituent in substantial amount having 2 or more glucose units in the molecule it is found to be ineffective for use in the pigment compositions of the present invention. Whilst it is preferred to use starch derivatives containing substantial amounts of constituents having several glucose units for example dextrin, British Gum, corn syrup or starch ethers such as the isopropyl ethers, it is also possible to use simple disaccharides such as sucrose alone or in admixture with other sugars or starch derivatives, and these simple disaccharides are included among the starch derivatives which may be used in the pigment dispersions of the present invention.

The cationic and/or non-ionic dispersing agents may be any of the water soluble substances commonly employed as surface-active agents in industrial processes. Especially useful cationic agents are cetyl trimethyl ammonium bromide, cetyl pyridinium bromide, products obtained by forming the quaternary ammonium derivatives of condensates of long chain fatty amines with ethylene oxide, and other long chain quaternary ammonium compounds. Especially suitable non-ionic agents are those obtained by condensing amines, alcohols, acids, esters or amides with ethylene oxide, for example octadecylamine condensed with 17 molecular proportions of ethylene oxide, tetraethylene pentamine monolauric acid amide condensed with 8.5 molecular proportions of ethylene oxide and glycerol monolaurate condensed with 23 molecular proportions of ethylene oxide.

Pigments which may be used in the pigment compositions of the present invention are any of those known in the art of mass colouration of viscose of which the following are examples from the Society of Dyers & Colourists Colour Index, 2nd Edition.

Red Pigment No. 12420
Red Pigment No. 12310
Red Pigment No. 12490
Red Pigment No. 12430
Yellow Pigment No. 11765
Yellow Pigment No. 11680
Yellow Pigment No. 11710
Blue Pigment No. 74160
Green Pigment No. 74260
Black Pigment No. 77266

The aqueous pigment compositions may be made by grinding the pigment in the presence of water, the surface active agent and the starch derivative, or the other ingredients may be added after the pigment has been ground. Small amounts of substances known to aid the grinding process may be added to the dispersions before or during grinding, for example small amounts of alkalis such as sodium hydroxide.

The invention includes the process of manufacturing shaped coloured articles made from regenerated cellulose by incorporating in viscose solution an aqueous pigment composition or dispersion as described above and thereafter extruding the viscose solution into an acid coagulating bath.

The invention is illustrated but not limited by the following examples in which parts and percentages are by weight.

*Example 1*

85 parts of a red pigment presscake (Colour Index, 2nd edition, No. 12420) containing about 18% solids, is mixed with 4 parts of the condensation product of octadecylamine and 12 molecules of ethylene oxide, 12 parts of dextrine, 0.2 part sodium hydroxide and 13 parts of water. When this mixture has become homogeneous it is ground in a convenient manner, e.g., by colloid milling or ball milling, until the pigment is sufficiently fine to be suitable for the mass colouration of viscose.

When the resulting paste is mixed into viscose a coloured mass is obtained which is essentially free from aggregated particles.

*Example 2*

85 parts of the pigment in Example 1 is mixed with 4 parts of the condensation product of tetraethylene pentamine monolauric amide with 8.5 molecules of ethylene oxide, 12 parts of dextrine, 0.2 part sodium hydroxide and 17 parts of water. The mixture is then treated as described in Example 1.

When the resulting paste is mixed with viscose a coloured mass is obtained which is essentially free from aggregated particles.

*Example 3*

85 parts of the pigment of Example 1 is mixed with 4 parts of cetyl trimethyl ammonium bromide, 12 parts of dextrine, 0.2 part of sodium hydroxide and 17 parts of water. The mixture is then treated as described in Example 1.

When the resulting paste is mixed into viscose a coloured mass is obtained which is substantially free from aggregated particles.

*Example 4*

85 parts of the pigment of Example 1 is mixed with 3 parts of the condensation product of cetyl alcohol with 17 molecules of ethylene oxide, 9 parts dextrine, 0.2 part sodium hydroxide and 21 parts of water. The mixture is then treated as described in Example 1.

When the resulting paste is mixed into viscose a coloured mass is obtained which is essentially free from aggregated particles.

*Example 5*

85 parts of a yellow pigment presscake (Colour Index 2nd edition, No. 11765) containing about 18% solids is mixed with 4 parts of the condensation product of β-naphthol and 14 molecules of ethylene oxide, 12 parts of dextrine, 0.2 part of sodium hydroxide and 16 parts of water. The mixture is then treated as described in Example 1.

When the resulting paste is mixed into viscose a coloured mass is obtained which is substantially free from aggregated particles.

*Example 6*

49 parts of a blue pigment presscake (Colour Index 2nd edition, No. 74160) having a solids content of about 36% is mixed with 4 parts of the condensation product of cetyl alcohol with 17 molecules of ethylene oxide, 12 parts dextrine, 0.1 part sodium hydroxide and 34 parts water. The mixture is then treated as described in Example 1.

When the resultant paste is mixed into viscose a coloured mass is obtained which is essentially free from aggregated particles.

*Example 7*

A blue pigment paste is made according to Example 6, with the exception that the 12 parts dextrine is replaced by 5 parts of isopropylether of starch (7% etherified) and 7 parts of water.

When the resulting paste is mixed into viscose a coloured mass is obtained which is substantially free from aggregated particles.

*Example 8*

A blue pigment paste is made according to Example 6 with the exception that 12 parts of dextrine and 8 parts of water are replaced by 20 parts of British Gum.

When the resulting paste is mixed into viscose, a coloured mass is obtained which is essentially free from aggregated particles.

*Example 9*

34 parts of a green pigment presscake (Colour Index 2nd Edition No. 74260) having a solids content of about 44.5% is mixed with 4 parts of the condensation product of cetyl alcohol with 17 molecules of ethylene oxide, 12 parts of dextrine, 0.1 part sodium hydroxide and 50 parts water. The mixture is then treated as described in Example 1.

When the resultant paste is mixed into viscose, a coloured mass is obtained which is essentially free from aggregated particles.

Thus it is seen that, in the above Examples 1–6 and 9, there is used about 58–79% dextrine based on the weight of dry pigment solids.

What we claim is:

In a process for the manufacture of shaped colored articles of regenerated cellulose comprising forming a viscose solution and converting the viscose to regenerated cellulose; the improvement comprising incorporating in said viscose solution before it is converted to regenerated cellulose an aqueous pigment composition consisting essentially of a pigment, water, a dispersing agent selected from the group consisting of cationic and non-ionic dispersing agents and at least about 58%, based on the weight of dry pigment solids of dextrine.

References Cited in the file of this patent

UNITED STATES PATENTS

| | | |
|---|---|---|
| 2,181,800 | Crossley et al. | Nov. 28, 1939 |
| 2,377,709 | Meunier | June 5, 1945 |
| 2,401,755 | Griffin et al. | June 11, 1946 |
| 2,674,619 | Lundsted | Apr. 6, 1954 |
| 2,875,077 | McLellan | Feb. 24, 1959 |

FOREIGN PATENTS

| | | |
|---|---|---|
| 772,308 | Great Britain | Apr. 10, 1957 |